Oct. 24, 1961 J. F. CHINLUND 3,005,466
SELF-CONTAINED VALVE
Filed May 9, 1957 2 Sheets-Sheet 1

INVENTOR.
JOSEPH F. CHINLUND
BY Joseph E. Ryan
ATTORNEY

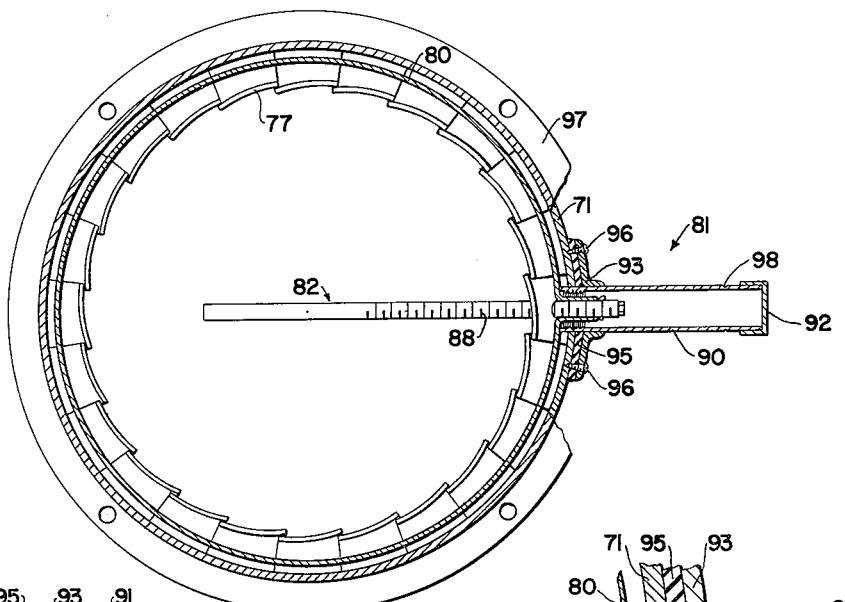

United States Patent Office 3,005,466
Patented Oct. 24, 1961

3,005,466
SELF-CONTAINED VALVE
Joseph F. Chinlund, Northbrook, Ill., assignor to Minneapolis-Honeywell Regulator Company, Minneapolis, Minn., a corporation of Delaware
Filed May 9, 1957, Ser. No. 658,127
6 Claims. (Cl. 137—486)

This invention relates to air conditioning apparatus and more particularly to an improved self-contained valve structure designed to control the flow of air conditioning medium therethrough.

In air conditioning apparatus of this type, the right of delivery of the air conditioning medium to the space to be air conditioned differs between various installations depending upon the space requirements. Where the flow of air conditioning mediums through a valve is controlled by a sensor sensing rate of flow, it has been found that it is necessary to vary the characteristics of the flow sensor or vary the velocity of the air conditioning medium at the flow sensor to obtain accurate delivery of the air conditioning medium at the valve for varying ranges of air delivery. In the air conditioning apparatus shown and described in the copending application of Lawrence Donahue, now Patent 2,828,076, dated March 25, 1958, and entitled air conditioning apparatus, over which this invention is an improvement, the valve and flow sensor together with the flow regulator are dimensioned and adjusted such that an accurate control over air delivery is obtained only over a limited range of air velocities. With the present invention, the ranges of flow of the air conditioning medium through the valving apparatus can be adjusted and an accurate delivery of air conditioning medium can be obtained with the same apparatus over extremely wide ranges of air velocities through the adjustment of a variable orifice mechanism associated with the valve and flow sensor as set forth herein. It is therefore an object of the subject invention to provide an improved self-contained valve structure which will regulate flow of an air conditioning medium therethrough over wide ranges of velocity of flow of the air conditioning medium, and at the desired flow curve for these ranges. Another object of this invention is to provide an improved self-contained valve apparatus having a flow sensor for controlling the valve operation and an adjustable orifice means associated with the flow sensor to adapt the flow sensor to varying capacities or velocities of flow. A further object of this invention is to provide a simplified compact adjustable orifice apparatus for use with a self-contained valve mechanism. These and other objects of the invention will become apparent from the reading of the attached description together with the drawings wherein:

FIGURE 2 is a sectional view of a portion of the improved air conditioning apparatus taken along the lines 2—2 of FIGURE 1.

FIGURES 3 and 4 are sectional views of a portion of the improved orifice apparatus showing constructional details.

FIGURE 5 is a sectional view of the flow regulator for the cold air valve shown in FIGURE 1 and FIGURE 6 is a sectional view of a portion of the flow regulator used with the warm air valve shown in FIGURE 1.

Figure 1:
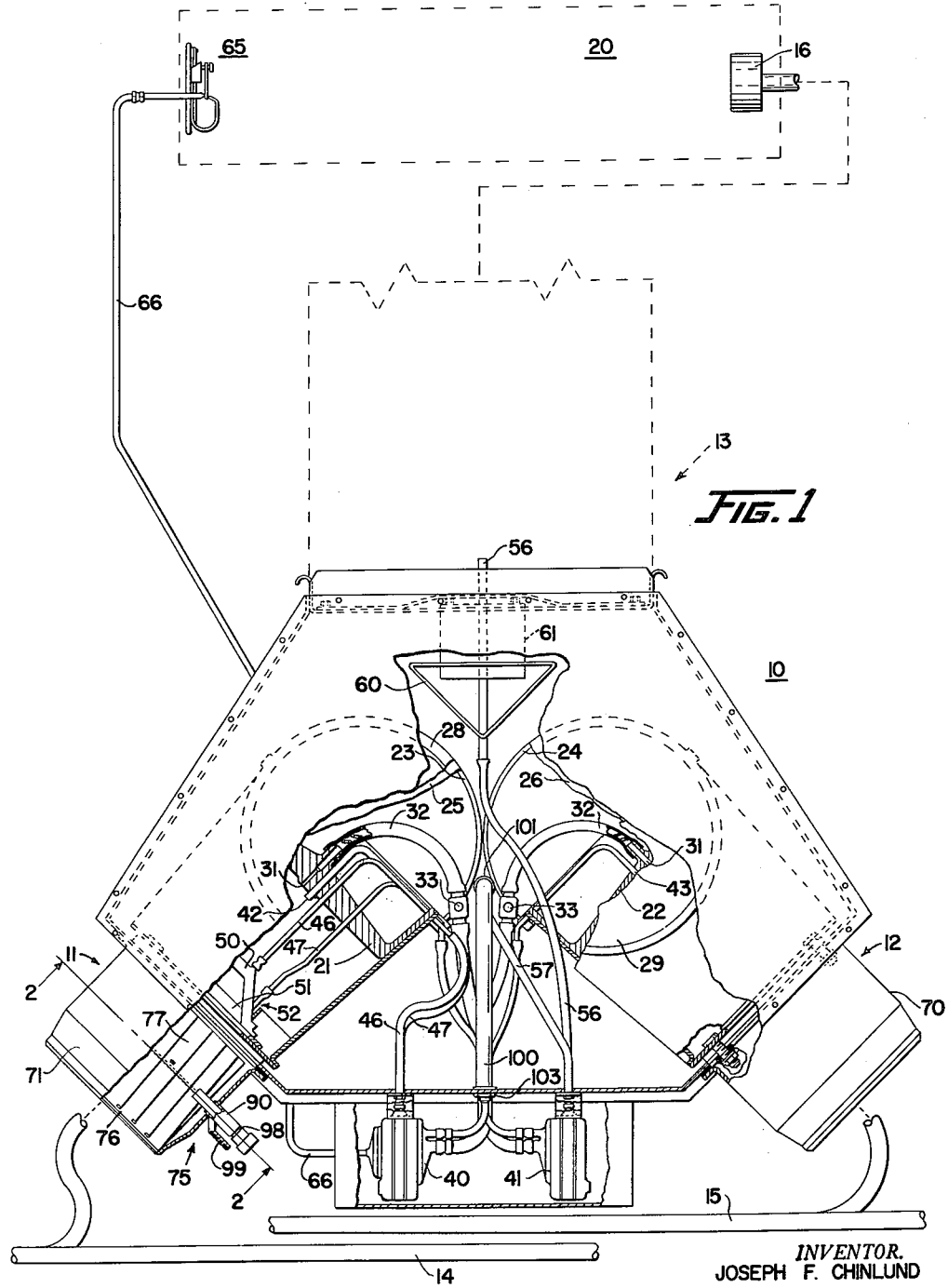
FIGURE 1 is a schematic view of the improved air conditioning apparatus.

My improved self-contained valve structure is shown in connection with an air distribution apparatus similar to that disclosed in the copending application of Lawrence E. Donahue, referred to above. In FIGURE 1 this air distribution apparatus is shown generally as including a valve housing structure 10 having a pair of inlet portions 11 and 12 leading into the valve housing structure which has a common outlet portion 13. The inlet portions of the duct structure which house the valves to be later identified in detail are connected respectively to trunk lines of an air conditioning structure indicated at 14 and 15 which trunk lines carry the air conditioning medium from a centrally located heat exchanger through the valves in the valve housing structure 10 to the outlet portion of the duct structure 13 which in turn is connected through suitable duct work to a grill indicated at 16 positioned in the space to be air conditioned indicated generally at 20.

The inlet portions 11 and 12 of the valve housing 10 include the projecting portions of the individual valve structures which are not shown completely in detail in FIGURE 1, in view of the fact that they are shown and claimed specifically in the aforementioned Donahue application. Each valve includes a centrally located V-shaped weir section 21, 22, respectively, which are positioned across the valve and has valving surfaces on the upper and lower sides thereof. These weirs are shown in section and are supported to extend across a circular section 23, 24 respectively, of the extremity of the valve across which diaphragms 25, 26 are positioned on the upper and lower surfaces of the circular sections 23, 24, cooperating with the upper and lower faces of the weirs 21, 22. Although not shown specifically in detail in the drawings, the diaphragms are held in this position over the apertures by means of cover members 28, 29, respectively, which are circular in form and are press fitted over the diaphragms to hold the same on the circular portions 23, 24 such that the diaphragms may cooperate with the respective weirs to control the flow of air conditioning medium to the respective valves. Between the cover members 28, 29 and the diaphragms 25, 26 on either side of the weirs are chambers into which the air conditioning medium in the duct structure is fed for the purpose of urging the diaphragms against the weirs for valving operation. A centrally located passage 31 in each weir with an associated conduit 32 for each weir have branch passages 33 extending to the upper and lower chambers behind each of the diaphragms for the purpose of supplying the air conditioning medium.

It will be appreciated that the valve details for the inlet portions 11 and 12 are identical and as will be later defined, the air conduits 32 which supply the air conditioning medium to the diaphragms for operating the same are also connected to the regulators 40, 41, respectively, which regulators control a relay mechanism venting the conduits to the atmosphere for the purpose of bleeding off the air pressure behind the diaphragms when it is desired to open the valves. These details will become apparent from a later description of the regulators. Also included in the weirs are an inlet pipe 42, 43 respectively, which supply some of the air conditioning medium directly to the regulators 40, 41 for valving purposes as will be later described. The weir 21 also includes a pair of conduits 46, 47 which are connected respectively to the impact and static pressure orifices or collector rings 50, 51 of a flow sensor 52 positioned in the inlet of the warm air valve. The details of the flow sensor, although not shown specifically herein, include a ring 51 having small orifices therein on the downstream side thereof forming a static pressure collector and a second smaller ring or tube 50 having impact pressure orifices on the upstream side and located concentric with and downstream of ring 51 which rings or tubes supply static and impact pressures to the regulator 40 through the conduits 46, 47 to provide a pressure differential proportional to flow for controlling the flow regulator 40 as indicated and disclosed in the beforementioned Donahue application. Included in the outlet portion 13 of the valve structure 10 is a static pressure tube 56 which is connected to the flow regulator 41 of the cold air valve in the inlet portion 12 and a second static pressure tube 57 positioned within the box or valve support structure 10 sensing pressure within the mixing chamber of the valve support structure 10, which together with the static pressure orifice 56 in the outlet give an indication of total flow through the output portion 13. A triangular shaped grid member 60 positioned near the outlet portion 11 and suitably supported through a bracket 61, which also mounts the static pressure tube 56, acts as a diffuser from the outlets of the respective valves to aid in the mixing of the air conditioning medium within the valve box 10.

As in the copending application of Donahue, a room thermostat 65 is positioned in the space to be air conditioned and is connected through a conduit 66 to the warm air flow regulator 40 to reset the same in a manner later to be described. As indicated in FIGURE 1, the inlet portion 12 for the cold air valve includes a connector portion 70 through which the valve is connected to duct structure 15 for the air conditioning installation. The inlet portion 11 includes a similarly shaped connecting portion 71 connected duct structure 14 which also serves as a circular support for a variable orifice mechanism indicated generally at 75. A variable orifice apparatus includes a circular member 76 having a plurality of leaf-like extensions 77 which are interleaved or so positioned that each leaf has one side surface disposed under an adjacent leaf extension and over the adjacent leaf extension on the opposite side such that the leaves may be displaced or flexed and the leaf like extensions or vanes will slide over one another to reduce the opening therethrough. The mechanism that urges the leaf like extensions toward one another to reduce the size of the opening between the leaf like extensions is best seen in FIGURE 2 as a wire means 80 which encircles the leaf like extensions or vanes midway along their extent. As shown in FIGURE 2, and more specifically in FIGURE 3, wire means 80 is attached to an adjusting mechanism indicated generally as 81, which includes a guide shaft 82 extending into the center of the orifice through a blade or leaf like extension 77 and through the cylindrical support member 71. This shaft has a first aperture 83 extending transversely therethrough through which the extremities of the wire means 80 are inserted and an axial aperture 85 which is tapped and into which a screw means 86 extends to press against the extremities of the wire means and secure the same to the shaft 82 as shown in FIGURES 3 and 4. Rod 82 is generally rectangular in cross section having two flat sides and two arcuate sides which are threaded along the extent of the shaft. It will be seen that the shaft 82, because of its flat sides and insertion through a blade, is prevented from rotating by being keyed into a slot in one of the leaves. Since each leaf bends in directly to the center of the duct, the slot remains in line with the flats on the threaded shaft 82. The slot is generally through one leaf to prevent binding. Also, although not shown in the drawings, the sides of the slot in the blade may be bent down and given a radius selected so that the threads on the flat threaded member cannot lock in the edge of the slot in the slotted leaf and thus interfere with free sliding action between these parts. The threaded portion of the shaft indicated at 88 in FIGURES 3 and 4 is adapted to engage an inner threaded portion 89 of a cylindrical adjusting member 90 which is also threaded on its outer periphery 91 through a supporting bracket 93 and an aperture in the cylindrical support 71 of the orifice. A sealing gasket 95 is positioned between the cylindrical support and the support bracket 93 which bracket is secured to the cylindrical support by screw means 96 such as is shown in FIGURE 2. A cap 92 is also fitted over the end of the member 90 for sealing purposes. Thus the shaft 82 will have its threaded periphery 88 engaging and cooperating with the threaded portion 89 of the adjusting member or sleeve 90. Upon rotation of the member 90 on its threaded mounting bracket 93, the cylindrical member will advance into the cylindrical support 71 and the shaft 82 will be withdrawn slightly from the confines of the cylindrical support 71 without rotating and withdrawing with it the wire means 80. The thread pitch on the threaded peripheries 88 and 89 differs from the pitch on the peripheries 91 and the threads in the support bracket 93 such that as the member 90 is rotated, it will effectively advance into the cylindrical support 71 pressing against the leaf like extensions to effectively locate the diameter of the wire means concentric with the duct.

It will be noted that all leaves are exacting in equal force outward only when the top of the blades are forming a circle concentric with the duct. The concentricity is forced on the leaves by the wire through the thread arrangement, and the leaves form a circle or circular opening. As the rod or shaft 82 is withdrawn from the confines of the cylindrical support member it reduces the circumference or length of the wire means 80. Thus the inner thread and wire determine the circumference of the orifice, and hence, determine the diameter of the circle. The outer thread and bushing act to shift the point of contact between leaves and threaded tube in such a way that the center of the diameter (i.e. center of the orifice circle) will always be at the center of the duct. Since the change in half circumference caused by a change in wire length is always 22/7 of the change in radius the corrective action of the outer threads of the tube maintains the orifice in constant concentricity with the duct. Hence the wire means will always remain concentric with the axis of the cylindrical support 71 and the ends of the flexible member 77 will define a substantially cylindrical orifice which will be concentric with the cylindrical support member. As indicated by the drawings, this portion of the apparatus is positioned upstream of the valve and is attached thereto by means of a flanged section 97 through the suitable screw means not shown. Associated with the cylindrical adjusting member 90 is an indicia 99 which is suitably secured to the cylindrical support member references to a reference mark 98 on the cylindrical member such that visual indication is provided as to the physical size of the orifice within the support member 71.

The variable orifice assembly 81, it will thus be seen operates to vary the cross sectional area or the circular opening or passage for the air conditioning medium through the inlet portion 11 upstream of the flow sensor 52 which confronts the air flow through the orifice. Thus air flow through the orifice impinges on the flow sensor to provide a pressure differential which controls the valve in inlet 11 as described above. By varying the circular size of the opening, the velocity of air flow or flow of air conditioning medium at this point is varied such that the velocity is increased as the diametrical dimension is decreased and decreased as the diametrical dimension is increased to vary the air flow velocity relative to the flow experienced in duct structure 14. Thus when a low capacity or low rate of delivery is required, in order that the sensors 52 may accurately provide a pressure output in proportion to a set point adjustment, it is necessary that this air flow velocity be slightly increased and hence the orifice mechanism is operated to reduce the orifice and increase the velocity at this point.

For larger rates or flow, the sensing apparatus 52 is so characterized that substantially no increase in air velocity at the sensing apparatus will produce pressure differentials sufficient to control the flow regulators to provide the desired output capacity from a valve.

In FIGURE 1, the other valve associated with the air conditioning apapratus and housed in the valve mounting structure 10 is connected to the cold air supply and is controlled from a static pressure differential indicative of total outflow through the passage 13. As indicated above, the static pressure orifice 56 senses the static pressure at the outlet portion 13 of the valve mounting structure and static pressure sensor 57 is positioned adjacent to the valves in the interior of the valve mounting structure 10. This latter tube 57 is shown in FIGURE 1 as supported by a U-shaped bracket member 100 which has wrapped around a central portion of the same a filter section 101 through which the static pressure tube 57 is connected to sense pressure within the valve mounting structure 10. The mounting bracket 100 is supported on the face of the valve mounting box 10 through suitable screw means such as indicated at 103.

The static pressure differential sensed between the tubes 57, 56 is supplied to the cold air flow regulator 41 shown in cross section in FIGURE 5. Also connected to the flow regulator is the supply conduit 32 which supplies the chambers for the diaphragms cooperating with the weirs of the cold air valve structure. In addition a supply of air conditioning medium is provided from conduit 42 for operating a pilot valve to control the venting of the conduit 32. In FIGURE 5, the air flow regulator shown is basically the same as that disclosed in the aforementioned Donahue application and differs therefrom only in that it employs a pilot valve for controlling the venting of the air supply lines feeding the chambers to operate the diaphragms of the valve. Two main flexible diaphragms 105, 106, respectively, define with a center portion 107 of the regulator 41 variable chambers to which the conduits 56, 57 are connected respectively. These conduits are shown in phantom since their physical connection to the regulator is out of view in the cross section of the regulator. A centrally located diaphragm 110 separates these two chambers and is connected to a bracket structure 111 suitably secured to the diaphragms 105, 106, and 110, respectively, such that the bracket section 111 moves in response to the pressure differential present in the respective chambers. An upper portion 115 of the flow regulator defines a recessed portion which is vented to the atmosphere as at 116 and houses a leaf spring member 117 secured to the upper portion 115, and a pivoted lever structure 120 which cooperates with a nozzle 121 also positioned on the upper portion 115. An adjusting screw 123 mounted in portion 115 adjusts the bias of the spring 117 the force of which is applied to the lever 120 through a projection 125. Lever 120 is supported and pivotally mounted on the upper portion 115 through a pivot flange 130 about which the lever 120 rotates. An adjustable screw 131 positioned in the lever 120 engages the bracket 111 and applies to the lever 120 the force created by the pressure differential between the two sealed chambers. A stop 133 included on the lever aids in the positioning of the lever relative to the pivot support 130. Also connected to the portion 115 is a portion 118 of the regulator between which is positioned a diaphragm 135, defining with the upper portion 115, a chamber 136, of a pilot relay, the diaphragm 135 of which cooperates with an inlet nozzle portion 140 to which is connected the main air conduit 32 of the regulator. The area above the diaphragm and adjacent the nozzle portion is vented to the atmosphere through apertures at 141. Chamber 136 is connected through a conduit 144 to a filter section 143 in the upper portion 118 to which the supply line 42 is connected. Thus the air conditioning medium will flow through the conduit 42, the filter 143 and the conduit 144 into the chamber 136 where it will create a force against the diaphragm 135 tending to deflect the same against the nozzle portion 140 of the relay blocking the passage 32 or closing the vent in the same to the atmosphere passages 141. Shown in phantom in FIGURE 5 is the small nozzle passage 150 in the nozzle 141 through which the chamber 136 is bled to atmosphere. Venting of the chamber 136 through the passages, 150 and 116 in the upper portion 115 of the flow regulator is controlled by the position of the lever 120. Attached to the lower section of the regulator is a portion 151 which in the cold air regulator valve has no function except for support of the diaphragm 106. This portion is vented to the atmosphere through a passage 154 such that the diaphragms 105, 106 have atmospheric pressures positioned on the outer side surfaces thereof. Thus the differential static pressures within the chambers thereof will give a true differential of air flow through the outlet portion 13 of the valve structure. The operation of this cold air flow regulator is conventional in that the pressure differential in the aforementioned chambers defined by the diaphragms 105, 106, 107 will operate on the bracket 111 to pivot the lever 120 against the force of the spring 117 which is applied to the lever 120 on the opposite side of the pivot from the screw 131. These forces displace the end of the lever relative to the nozzle 121 thereby varying the air pressure in the chamber 136 and allowing the diaphragm 135 to move away from the nozzle portion 140 thereby decreasing the pressure in the supply line 32 such that the pressure behind the diaphragms of the main valve will be reduced and the valve will be allowed to open, movement of the bracket 111 in the opposite direction will produce the opposite result in that the relay mechanism will cause the diaphragm 135 to close on the nozzle 140 increasing the pressure behind the diaphragms of the valve structure and closing off the air flow across the weir 22.

The flow regulator for the warm air valve is substantially identical to the flow regulator for the cold air valve shown in FIGURE 5 except for the addition of a pressure regulator and the connection of the thermostatic element to a lower diaphragm to provide a reset pressure on the same. A portion of this regulator is shown in FIGURE 5 as a modification of the cold air regulator. The warm air regulator 40 includes a modification of the section 115, 107, and 151 to provide a passage from the conduit 42 and the filter section 143, the passage being identified as 160 extending through these portions and terminating in a chamber 161 defined by a recess in the portion 151 and a diaphragm 162 overlying the same. Portion 151 is further modified to provide a valve closure member 165 which cooperates with a plate 166 on the diaphragm 162 to close a passage in the form of a small orifice 167 through the diaphragm to the lower side of the diaphragm which is secured by a backing plate 170 having apertures 171 therein, thereby venting the area on the lower side of the diaphragm to atmosphere. The backing plate supports a spring 172 which urges the diaphragm against the valve plug 165 to close the passage to atmosphere from the chamber 161. The chamber 161 also has a second passage 175 therein leading to a chamber on the lower side of the diaphragm 106 which chamber is identified at 176. The passage 154 in portion 151 which terminates in chamber 175 is connected to the thermostat line 66. The diaphragm 162 and the spring 172 form a pressure regulator such that the air conditioning medium supplied to the chamber 161 will be regulated according to the adjustment of the spring in the plate 170 to allow a regulated pressure to pass through the passage 175 to the chamber 176 and from the chamber 176 through the conduit 66 to the thermostat wherein a bleed nozzle adjusts its pressure according to the set point of the thermostat. This control pressure resets the flow regulator by cooperating with the pressure differential between the chambers formed by the diaphragms 105, 106, 107 to control the relay of the flow regulator. In the warm air regulator, these latter chambers are connected respectively to the conduits 46, 47 of the flow sensor 52 and the combination of the pressure differential indicative of flow in the inlet portion of the valve structure 11 reset by pressure indicative of temperature setting from the thermostat 65 will operate the relay mechanism, that is, move the lever 120 relative to the nozzle 121 to control the flow in the conduit 32 leading to the valves associated with the warm air supply. In the warm air regulator this operation is substantially the same as that shown in the aforementioned Donahue application.

In operation, the subject air conditioning and distribution apparatus is generally adapted to be connected to a double duct air conditioning system in which the air conditioning medium in the form of tempered air of two different temperatures is conveyed from a central heating plant or heat exchangers along a duct work to be supplied to a plurality of units to be air conditioned. The air conditioning apparatus as shown in FIGURE 1 is adapted to be connected at its inlet portions respectively to the supply ducts of the air conditioning apparatus or system to proportion the amount of tempered air from each of the sources to a common outlet portion which is adapted to be connected to an individual space unit to be air conditioned. The valves or flow control means within the inlet portions of the duct structure are of a self contained type. In air conditioning apparatus of this type, as shown in the beforementioned Donahue application, it has been found desirable to connect the warm air valve to a velocity sensor in the inlet portion and reset the same by temperature of the space to be air conditioned and to control the cold air valve from an indication of total flow at the outlet side of the valve structure. However this arrangement may be reversed if desired. The particular valve design of our subject invention is specifically directed to the apparatus in which the velocity sensor is included in the inlet portion to be reset by temperature and in which a variable orifice apparatus is utilized in connection with the velocity sensor to adjust the same for varying flow capacities of the air conditioning apparatus. With this arrangement, the capacity of the valve may be adjusted by merely making a manual setting of the orifice which will adjust the pressure at the sensing element to provide a particular level of control at the flow regulator to operate the valve associated therewith and provide a desired level of flow velocity at the desired flow curve from the same. Variation from this set flow velocity will be obtained by the resetting operation of the thermostat which acts on the flow regulator to cojointly control, with the pressure differential indicative of velocity of flow the pilot relay of the flow regulator and hence the pressure in the chambers behind the diaphragms of the main valve to throttle the flow of air conditioning medium through the inlet portion of the valve.

In considering this invention it should be remembered that the present disclosure is intended to be illustrative only and the scope of the invention is to be determined by the appended claims.

I claim as my invention:

1. In an air conditioning system, a duct structure for carrying air conditioning medium, flow controlling means positioned in said duct structure to vary the flow of said air conditioning medium therethrough, regulator means for controlling said flow controlling means in said duct structure, a flow sensor in said duct structure upstream of said flow control means and comprising a first tube having a plurality of static pressure orifices and a second tube having a plurality of impact pressure orifices, means connecting said impact and said static pressure tubes of said flow sensor to said regulator means to operate said flow controlling means, and a variable orifice means positioned in said duct structure upstream of said flow sensor and adjustable to vary the orifice such that the flow of air conditioning medium therefrom impinges on said flow sensor in all adjusted positions and is varied in velocity with adjustment of said orifice means.

2. In an air conditioning system, a duct structure for carrying air conditioning medium, flow controlling means positioned in said duct structure to vary the flow of said air conditioning medium therethrough, regulator means for controlling said flow controlling means in said duct structure, a flow sensor in said duct structure upstream of said flow control means and comprising a first tube having a plurality of static pressure orifices and a second tube having a plurality of impact pressure orifices, means connecting said impact and said static pressure tubes of said flow sensor to said regulator means to operate said flow controlling means, and means positioned in said duct structure upstream of the flow sensor to vary the cross sectional area of said duct structure upstream of said flow sensor to vary the velocity of flow of air conditioning medium directed on said sensor.

3. In an air conditioning system, a duct structure for carrying air conditioning medium, flow controlling means positioned in said duct structure to vary the flow of said air conditioning medium therethrough, regulator means for controlling said flow controlling means in said duct structure, a flow sensor in said duct structure upstream of said flow control means and comprising a first tube having a plurality of static pressure orifices and a second tube having a plurality of impact pressure orifices, means connecting said impact and said static pressure tubes of said flow sensor to said regulator means to operate said flow controlling means, and variable orifice means positioned in said duct structure upstream of said flow sensor such that the flow of air conditioning medium therefrom impinges on said flow sensor, said orifice means including a cylindrical member having a plurality of leaflike extensions which are deformed such that each has a side surface underlying a side surface of an adjacent extension and overlying a side surface of an adjacent extension on the opposite side, wire means encircling the leaflike extensions, support means mounting said cylindrical member in said duct structure, means supported at and extending from said support means into said cylindrical member and securing the extremities of said wire means, and adjustable screw means threaded into said support means and cooperating with screw means on said extending means being adapted to engage the wire means to deflect the leaflike extensions and withdraw the extending means from said cylindrical support member to vary the size of the orifice in said duct structure.

4. In a self-contained valve for an air conditioning medium, a duct structure, a centrally located weir in said duct structure attached thereto, an aperture in said duct structure positioned adjacent said weir, a diaphragm positioned over said aperture, cover means positioned over said diaphragm securing the same to said duct structure and defining with said diaphragm a variable chamber, said diaphragm cooperating with said weir to control the flow of said air conditioning medium through said duct structure, conduit means positioned in said weir and connected to said variable chamber, means connected to said conduit means and adapted to selectively vent said conduit means to the atmosphere, pressure responsive means positioned in said duct structure upstream of said weir for sensing flow through said duct structure and connected to said last named means to control the same, and variable orifice means positioned in said duct structure upstream of said pressure responsive means such that flow of the air conditioning medium therein impinges on said pressure responsive means to vary velocity of flow of the air conditioning medium sensed by said pressure responsive means for variable positions of said orifice means.

5. In a self-contained valve for an air conditioning medium, a duct structure, a centrally located weir in said duct structure attached thereto, an aperture positioned in said duct structure adjacent said weir, a diaphragm positioned over said aperture, cover means positioned over said diaphragm securing the same to said duct structure and defining with said diaphragm a variable chamber, said diaphragm cooperating with said weir to control the flow of said air conditioning medium through said duct structure, conduit means positioned in said weir and connected to said variable chamber, means connected to said conduit means and adapted to selectively vent said conduit means to the atmosphere, pressure responsive means positioned in said duct structure upstream of said weir and sensing flow through said duct structure and connected to said last named means to control the same, and variable orifice means including a cylindrical member having a plurality of flexible vanes interleaved such that the vanes may be flexed to form a circular opening of varying diameters positioned in said duct structure upstream of said pressure responsive means such that flow of the air conditioning medium therein impinges on said pressure responsive means, means encircling said flexible means to vary the circular opening of said cylindrical member, and manually adjustable means connected to said last named means to position said encircling means and adjust said circular opening to vary the velocity of flow of the air conditioning medium on said pressure responsive means.

6. In a self-contained valve for an air conditioning medium, a duct structure, a centrally located weir in said duct structure attached thereto, an aperture positioned in said duct structure adjacent said weir, a diaphragm positioned over said aperture, cover means positioned over said diaphragm securing the same to said duct structure and defining with said diaphragm a variable chamber, said diaphragm cooperating with said weir to control the flow of said air conditioning medium through said duct structure, conduit means positioned in said weir and connected to said variable chamber, means connected to said conduit means and adapted to selectively vent said conduit means to the atmosphere, pressure responsive means positioned in said duct structure upstream of said weir and sensing flow through said duct structure being connected to said last named means to control the same, and means positioned upstream of said pressure responsive means and connected to said duct structure to vary the cross sectional area of said duct structure confronting said pressure responsive means to vary the velocity of air flow therethrough.

References Cited in the file of this patent

UNITED STATES PATENTS

| | | |
|---|---|---|
| 477,192 | Bastian | June 14, 1892 |
| 1,108,128 | Buffum | Aug. 25, 1914 |
| 2,216,292 | Evleth | Oct. 1, 1940 |
| 2,598,208 | Bailey | May 27, 1952 |
| 2,603,062 | Weiler | July 15, 1952 |
| 2,627,703 | Spencer | Feb. 10, 1953 |
| 2,633,869 | Plank | Apr. 7, 1953 |
| 2,665,707 | Stover | Jan. 12, 1954 |
| 2,828,076 | Donahue | Mar. 25, 1958 |